(12) United States Patent
Yoshida et al.

(10) Patent No.: US 9,876,396 B2
(45) Date of Patent: Jan. 23, 2018

(54) WIRELESS POWER TRANSMITTING APPARATUS AND WIRELESS POWER TRANSMISSION SYSTEM

(71) Applicant: MURATA MANUFACTURING CO., LTD., Kyoto-fu (JP)

(72) Inventors: Fumio Yoshida, Kyoto-fu (JP); Satoshi Yamaguchi, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 218 days.

(21) Appl. No.: 14/878,338

(22) Filed: Oct. 8, 2015

(65) Prior Publication Data

US 2016/0118809 A1 Apr. 28, 2016

(30) Foreign Application Priority Data

Oct. 27, 2014 (JP) .................................. 2014-217932

(51) Int. Cl.
| | |
|---|---|
| *H02J 7/00* | (2006.01) |
| *H02J 50/10* | (2016.01) |
| *H02J 50/12* | (2016.01) |
| *H02J 7/02* | (2016.01) |

(52) U.S. Cl.
CPC ............ *H02J 50/10* (2016.02); *H02J 7/0042* (2013.01); *H02J 7/025* (2013.01); *H02J 50/12* (2016.02)

(58) Field of Classification Search
CPC ................................ H02J 50/10; H02J 7/0042
USPC ......................................................... 307/104
See application file for complete search history.

(56) References Cited

U.S. PATENT DOCUMENTS

| | | | | |
|---|---|---|---|---|
| 9,178,369 | B2* | 11/2015 | Partovi | .................. H02J 7/025 |
| 9,431,830 | B2* | 8/2016 | Ryu | ........................ H02J 5/005 |
| 9,431,989 | B2* | 8/2016 | Deguchi | ................. H01F 38/14 |
| 2012/0293005 | A1* | 11/2012 | Ryu | ...................... B60L 11/182 |
| | | | | 307/104 |
| 2012/0306262 | A1 | 12/2012 | Taguchi | |
| 2013/0002035 | A1* | 1/2013 | Oodachi | ................. H02J 5/005 |
| | | | | 307/104 |

FOREIGN PATENT DOCUMENTS

| | | |
|---|---|---|
| JP | H08-148360 A | 6/1996 |
| JP | H11-176675 A | 7/1999 |
| JP | 2001-268823 A | 9/2001 |
| JP | 2009-106126 A | 5/2009 |
| JP | 2012-186909 A | 9/2012 |
| JP | 2012-248747 A | 12/2012 |
| WO | 2014/057959 A1 | 4/2014 |

OTHER PUBLICATIONS

An Office Action; "Notice of Reasons for Rejection," issued by the Japanese Patent Office on Nov. 29, 2016, which corresponds to Japanese Patent Application No. 2014-217932 and is related to U.S. Appl. No. 14/878,338; with English language translation.

* cited by examiner

*Primary Examiner* — Dinh T Le
(74) *Attorney, Agent, or Firm* — Studebaker & Brackett PC

(57) ABSTRACT

A wireless power transmitting apparatus includes: a loop conductor for power transmission having an inductance; an inverter circuit configured to receive a DC voltage, convert the DC voltage into an AC voltage, and apply the AC voltage to the loop conductor; a capacitor connected between one end of the loop conductor and at least one end of the inverter circuit; and a metal layer covering one of the faces formed by the loop conductor farthest from a power receiving apparatus.

5 Claims, 8 Drawing Sheets

WIRELESS POWER TRANSMITTING APPARATUS AND WIRELESS POWER TRANSMISSION SYSTEM

CROSS-REFERENCE TO RELATED APPLICATION

This application claims benefit of priority to Japanese Patent Application No. 2014-217932 filed Oct. 27, 2014, the entire content of which is incorporated herein by reference.

TECHNICAL FIELD

The present disclosure relates to a wireless power transmitting apparatus that transmits power to a power receiving apparatus in a wireless manner and relates to a wireless power transmission system.

DESCRIPTION OF THE RELATED ART

A wireless power transmission system based on magnetic field coupling is used to charge, for example, a battery housed in a portable apparatus.

A wireless power transmission system using a magnetic field coupling method is formed of a wireless power transmitting apparatus and a power receiving apparatus. The wireless power transmitting apparatus includes a power transmitting coil and a power transmitting circuit that causes a high-frequency current to flow through the power transmitting coil. The power receiving apparatus includes a power receiving coil that links with a magnetic field generated by a current flowing through the power transmitting coil and a power receiving circuit that rectifies and smoothes a current generated in the power receiving coil (Japanese Unexamined Patent Application Publication No. 2001-268823 and International Publication No. 2014/057959).

Japanese Unexamined Patent Application Publication No. 2001-268823 discloses that the periphery of a power-transmitting-side coil is covered by a nonmagnetic casing. However, this is basically a non-contact power transmitting apparatus that uses a transformer including a ferrite core, where a primary core and a secondary core need to accurately face each other.

On the other hand, in the case where the configuration of the wireless power transmitting apparatus disclosed in International Publication No. 2014/057959 is employed, without arranging a power transmitting coil in the air, a "power transmitting stand" including the power transmitting coil is placed on a desk and used. However, when an object on which the power transmitting stand is placed includes a metal portion (for example, when the system is used by placing the power transmitting stand on a metal desk), an eddy current flows through the metal portion due to a magnetic field generated by the power transmitting coil. This eddy current causes heat loss (Joule loss) to be generated. In other words, the power transmission efficiency decreases.

SUMMARY

In view of the situations described above, it is an object of the present disclosure to provide a wireless power transmitting apparatus and a wireless power transmission system that allow an eddy current induced in, for example, a supporting desk to be suppressed and power transmission efficiency to be increased.

(1) A wireless power transmitting apparatus according to preferred embodiments of the present disclosure includes: a loop conductor for power transmission having an inductance; an inverter circuit configured to receive a DC voltage, convert the DC voltage into an AC voltage, and apply the AC voltage to the loop conductor; a capacitor connected between one end of the loop conductor and at least one end of the inverter circuit; and a metal layer covering one of faces formed by the loop conductor farthest from a power receiving apparatus.

As a result of one of the faces formed by the loop conductor farthest from a power receiving apparatus being covered by a metal layer, it becomes unlikely that the power transmission efficiency is influenced by the material of a supporting structure (e.g., desk) on which the power receiving apparatus is placed.

(2) It is preferable that the metal layer be formed of aluminum, copper, brass, bronze, or zinc. As a result of the metal layer being a metal having a low relative magnetic permeability and a low resistivity in this manner, eddy current loss is suppressed and a decrease in power transmission efficiency is suppressed. In addition, an influence from the material of the supporting structure is reduced and the resonant frequency of an LC resonant frequency is maintained constant, such that a decrease in power transmission efficiency is suppressed.

(3) In (1) and (2) described above, it is preferable that a distance between the metal layer and the loop conductor be substantially identical to a maximum distance between a center of an area surrounded by the loop conductor (simply, the center of the loop opening) and the loop conductor. With this configuration, an eddy current can be suppressed without increasing the height of the loop conductor above a supporting structure (e.g., desk) on which the power transmitting apparatus is placed.

(4) In (1) to (3) described above, it is preferable that the loop conductor include a concave portion that is at least partly indented toward an inside of a periphery of a loop formation area of the loop conductor and have a total length larger than a peripheral length of the loop formation area. With this configuration, a distance from the center of an area surrounded by the loop conductor to the loop conductor is reduced, such that the height of the loop conductor above the supporting structure (e.g., desk) on which the power transmitting apparatus is placed can be reduced.

(5) A wireless power transmission system according to preferred embodiments of the present disclosure is formed of the wireless power transmitting apparatus according to any one of (1) to (4) described above and a power receiving apparatus configured to receive power as a result of being coupled to the wireless power transmitting apparatus through a magnetic field.

(6) In (5) described above, it is preferable that $d1 \geq d2$, $d1$ being a height of the loop conductor above the metal layer and $d2$ being a distance between the loop conductor and a power receiving coil of the power receiving apparatus. With this configuration, an eddy current induced in the metal layer is suppressed.

According to preferred embodiments of the present disclosure, as a result of one of the faces formed by the loop conductor farthest from a power receiving apparatus being covered by a metal layer, it becomes unlikely that the power transmission efficiency is influenced by the material of a supporting structure (e.g., desk) on which the power receiving apparatus is placed.

Other features, elements, characteristics and advantages of the present disclosure will become more apparent from the following detailed description of preferred embodiments of the present disclosure with reference to the attached drawings.

BRIEF DESCRIPTION OF THE DRAWINGS

FIG. 5A is a diagram illustrating an example of the positional relationship among loop conductors and a power receiving coil, and FIG. 5B is a sectional view taken along line 5-5 in FIG. 5A.

DETAILED DESCRIPTION

Hereinafter, a plurality of embodiments of the present disclosure will be described by using a number of specific examples with reference to the drawings. In the figures, identical components are denoted by the same reference symbol. In the second and subsequent embodiments, descriptions of things that are common to the first embodiment will be omitted and only different points will be described. In particular, descriptions of similar operations and effects based on similar configurations will not be repeated in every embodiment.

First Embodiment

Figure 1A:
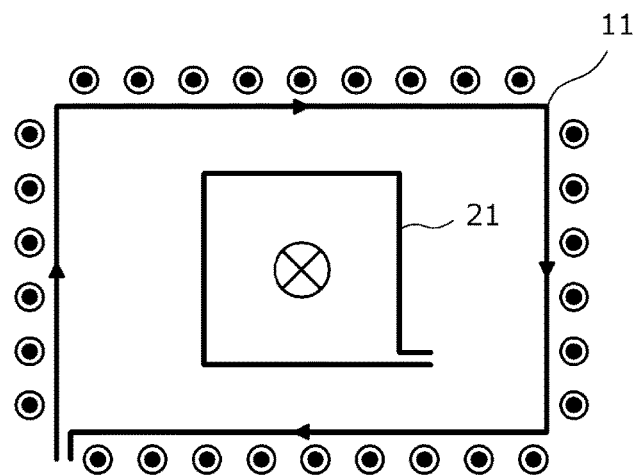
FIG. 1A is a plan view of the major portions of a wireless power transmitting apparatus and a power receiving apparatus according to a first embodiment and FIG. 1B is a front view thereof.
Figure 1B:
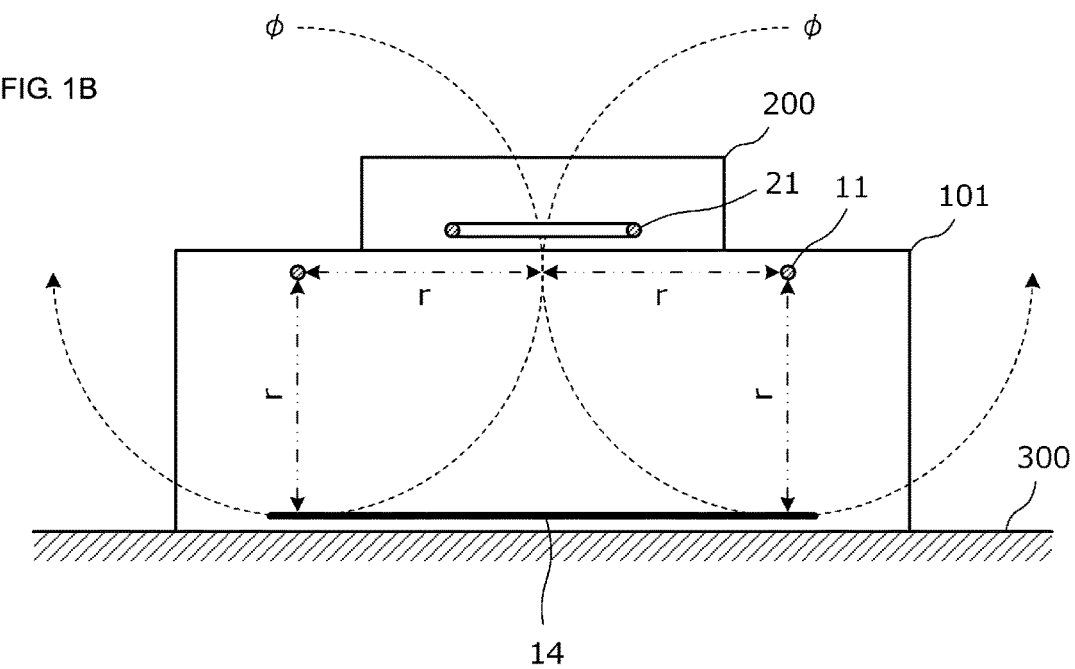

FIG. 1A is a plan view of the major portions of a wireless power transmitting apparatus 101 and a power receiving apparatus 200 according to a first embodiment and FIG. 1B is a front view thereof.

The wireless power transmitting apparatus 101 is placed on a supporting structure (e.g., desk) 300. The wireless power transmitting apparatus 101 includes a power transmitting loop conductor (hereinafter, simply called a "loop conductor") 11 and the power receiving apparatus 200 includes a power receiving coil 21. The power receiving apparatus 200 is placed on the top surface of the wireless power transmitting apparatus 101. In this state, the power receiving coil 21 of the power receiving apparatus 200 faces the loop conductor 11 of the wireless power transmitting apparatus 101.

The loop conductor 11 is shaped like a single-turn substantially rectangular loop in the present embodiment. The power receiving coil 21 is also shaped like a single-turn substantially rectangular loop in the present embodiment. Each of them may be a coil substantially shaped like a multi-turn loop.

The wireless power transmitting apparatus 101 includes a metal layer 14 that covers one of the two faces of the loop conductor 11 farthest from the power receiving apparatus 200. The metal layer covers one of the faces formed by the loop conductor which is opposite to the face opposed to the power receiving apparatus. In other words, the metal layer 14 covers the whole area of the back surface of the loop formation area (a power transmitting area) formed by the loop conductor 11. The metal layer 14 is formed of a metal material having a low relative magnetic permeability and a low resistivity, such as aluminum, copper, brass, bronze, or zinc.

Magnetic flux φ generated by the loop conductor 11 links with the power receiving coil 21. As a result, the loop conductor and the power receiving coil 21 are coupled to each other through a magnetic field. Here, as a result of using a metal having a low relative magnetic permeability and a low resistivity as the metal material of the metal layer 14, eddy current loss induced in the metal layer 14 is suppressed to a minimum, such that a decrease in power transmission efficiency can be suppressed. In addition, as a result of a metal layer having a low relative magnetic permeability and a predetermined thickness being sandwiched between the loop conductor 11 and the supporting structure (e.g., desk) 300, the resonant frequency of the LC resonant circuit is maintained constant irrespective of the material of the supporting structure 300, such that a decrease in power transmission efficiency can be suppressed.

Note that it goes without saying that similar effects are obtained even when inevitably remaining elements contained in aluminum, copper, brass, or bronze described above or minute amounts of other elements that would not considerably change the physical properties are used.

In the example illustrated in FIG. 1B, a distance between the metal layer 14 and the loop conductor 11 is substantially the same as the maximum distance r among the distances from the center (center of the rectangular loop) between the opposite conductor portions of the loop conductor 11 to the loop conductor 11. As a result, an eddy current induced in the metal layer 14 by a magnetic field generated by the loop conductor 11 can be sufficiently suppressed. In other words, the eddy current can be suppressed without increasing the height of the loop conductor 11 above the supporting structure 300 more than necessary.

Figure 2A:
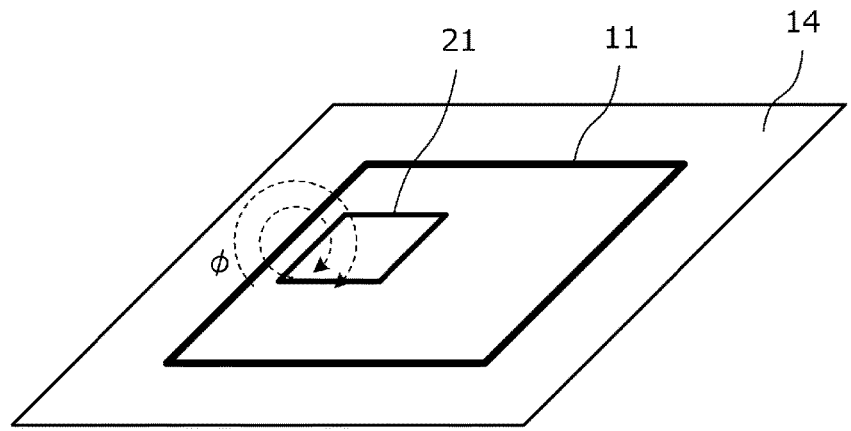
FIGS. 2A to 2C are diagrams illustrating a wireless power transmission system including the wireless power transmitting apparatus and the power receiving apparatus according to the first embodiment.
Figure 2B:
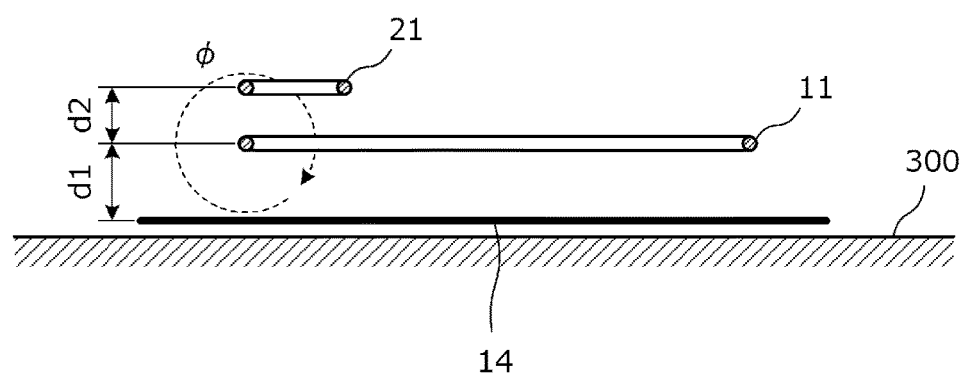
Figure 2C:
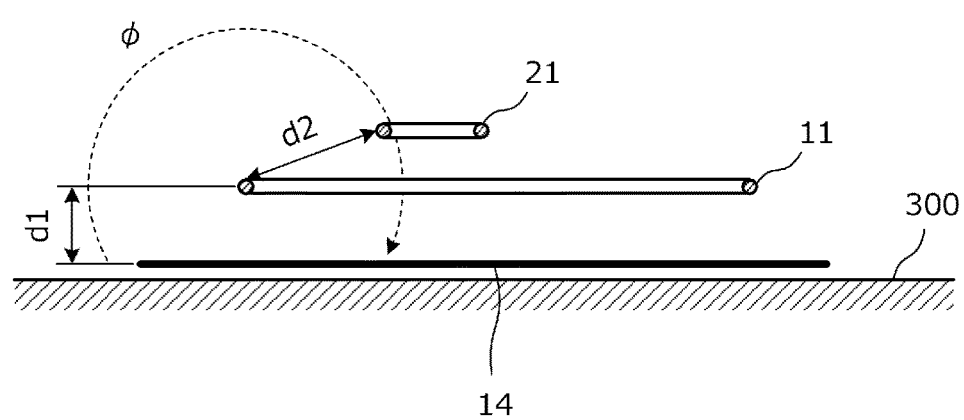

FIGS. 2A, 2B, and 2C are diagrams illustrating a wireless power transmission system including the wireless power transmitting apparatus and power receiving apparatus of the present embodiment. FIG. 2A is a schematic perspective view illustrating the positional relationship among the power receiving coil 21, the loop conductor 11, and the metal layer 14. FIGS. 2B and 2C are front views illustrating the positional relationship among the power receiving coil 21, the loop conductor 11, and the metal layer 14.

Referring to FIG. 2B, d1 denotes a distance between the metal layer 14 and the loop conductor 11, and d2 denotes a distance between the loop conductor 11 and the power receiving coil 21. In the case where d1≥d2, the power receiving coil 21 is positioned within the loop of magnetic flux going around in a range in which magnetic flux φ generated by the loop conductor 11 does not reach the metal layer 14. Hence, the power receiving coil 21 is coupled to the loop conductor 11 through a magnetic field in a state of being unlikely to receive an influence from an eddy current generated in the metal layer 14.

On the other hand, when d1<d2 as illustrated in FIG. 2C, the power receiving coil 21 is positioned within the loop of magnetic flux φ reaching the metal layer 14 among the loops of magnetic flux generated by the loop conductor 11. Hence, the power receiving coil 21 is coupled to the loop conductor 11 through a magnetic field in a state of being strongly influenced by an eddy current generated in the metal layer 14.

In this manner, by making the distance d1 between the loop conductor 11 and the metal layer 14 larger than the distance d2 between the loop conductor 11 and the power receiving coil 21, an eddy current induced in the metal layer can be suppressed.

Figure 3:
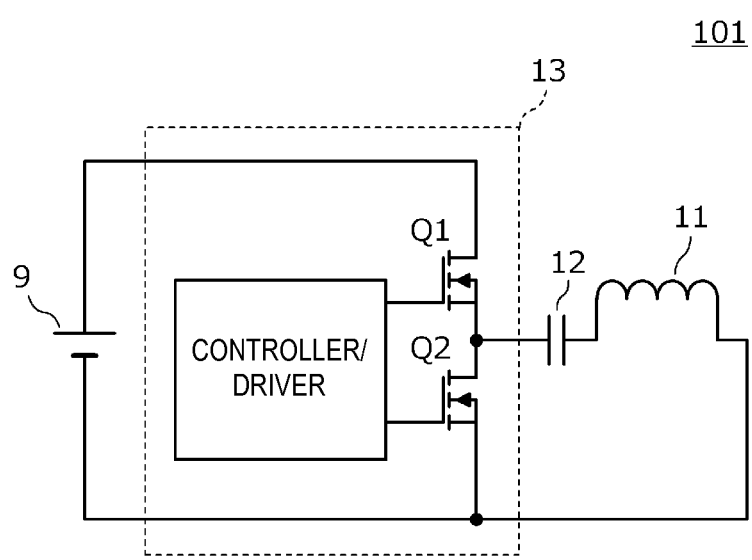
FIG. 3 is a circuit diagram of the wireless power transmitting apparatus.

FIG. 3 is a circuit diagram of the wireless power transmitting apparatus 101. The wireless power transmitting apparatus 101 includes a series circuit formed of an inverter circuit 13, a DC power supply 9, the loop conductor 11, and a capacitor 12. The loop conductor 11 and the capacitor 12 form an LC resonant circuit. The inverter circuit 13 includes a high-side switch Q1, a low-side switch Q2, and a controller/driver circuit that performs on/off control of these switches. The controller/driver circuit alternately switches the high-side switch Q1 and the low-side switch Q2 on and off at the resonant frequency of the LC resonant circuit. As a result, the operation of a resonant inverter circuit is realized, such that an alternating magnetic field is generated by a current flowing through the loop conductor 11.

Figure 4:
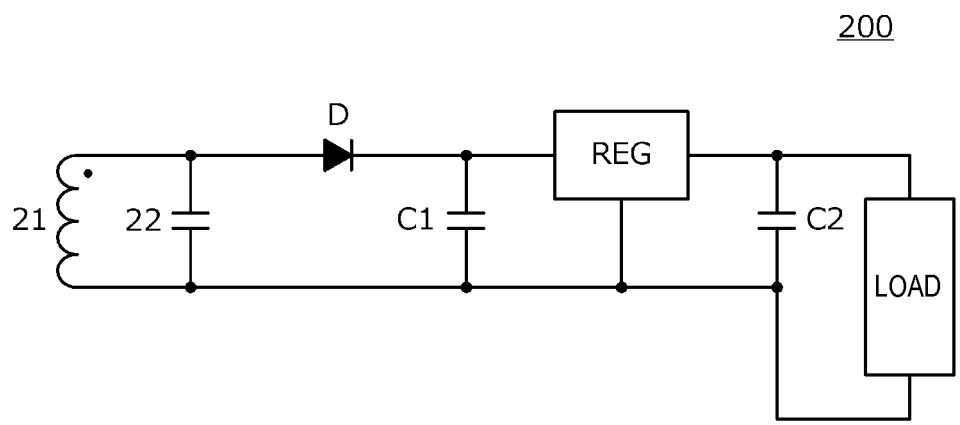
FIG. 4 is a circuit diagram of the power receiving apparatus.

FIG. 4 is a circuit diagram of the power receiving apparatus 200. The power receiving coil 21 and a capacitor 22 form an LC resonant circuit. The resonant voltage of this LC resonant circuit is rectified and smoothed by a diode D and a capacitor C1, then converted into a constant voltage by a regulator circuit REG and a capacitor C2, and supplied to a load.

Second Embodiment

Figure 5A:
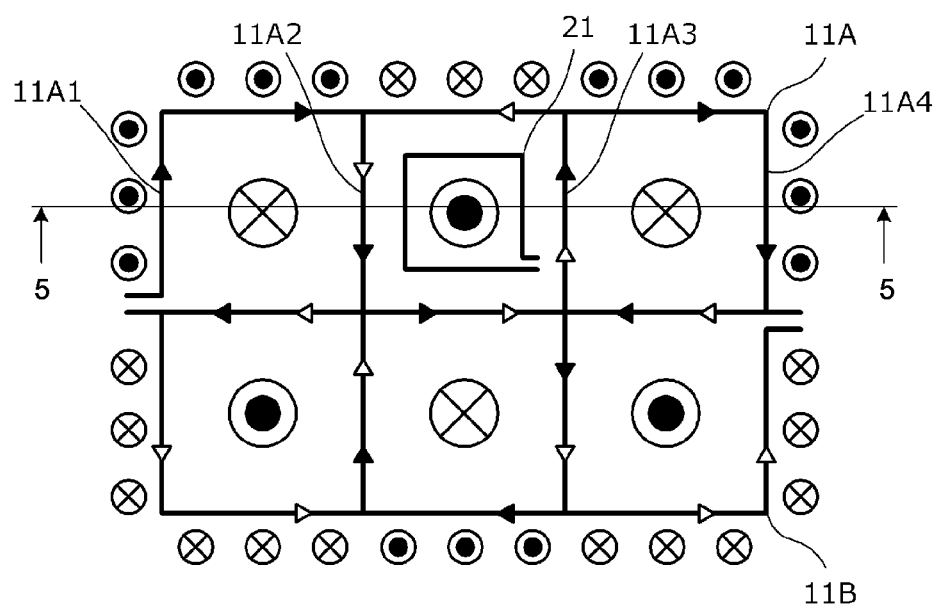
FIGS. 5A and 5B are diagrams illustrating the configuration of a loop conductor of a wireless power transmitting apparatus according to a second embodiment.
Figure 5B:
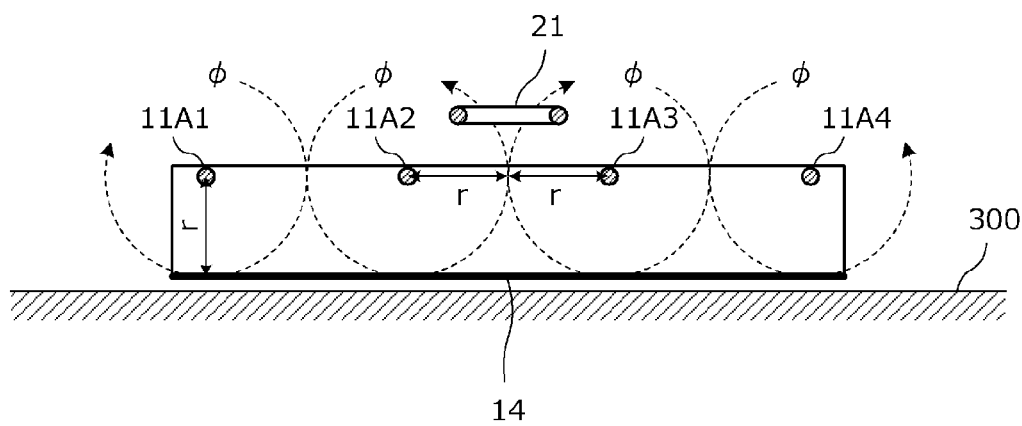
Figure 6A:
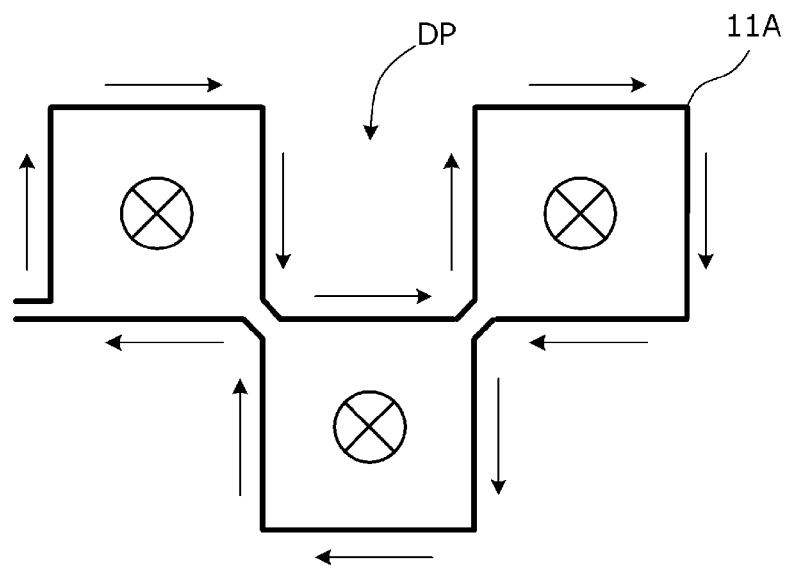
FIGS. 6A and 6B are plan views of the loop conductors in a separated state.
Figure 6B:
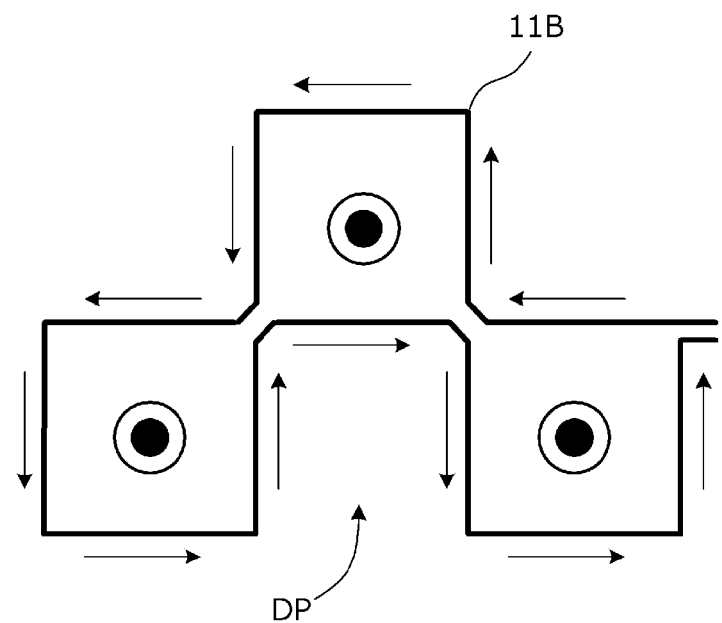

FIGS. 5A and 5B are diagrams illustrating the configuration of the loop conductor of a wireless power transmitting apparatus according to a second embodiment. FIG. 5A is a diagram illustrating an example of the positional relationship among loop conductors 11A and 11B and a power receiving coil 21. FIG. 5B is a sectional view taken along line 5-5 in FIG. 5A. FIGS. 6A and 6B are plan views of the loop conductors 11A and 11B in a separated state. The loop conductor 11A is a single loop conductor as a whole and includes three substantially rectangular portions. Similarly, the loop conductor 11B is a single loop conductor as a whole and includes three substantially rectangular portions.

The two loop conductors 11A and 11B are connected in parallel or in series with each other and are connected to an inverter circuit. When currents flow through the loop conductors 11A and 11B in the directions illustrated in FIGS. 6A and 6B at the timing of a half cycle of a current output from the inverter circuit, magnetic flux φ illustrated in FIGS. 5A and 5B is generated. In FIG. 5A, the directions of the magnetic flux are denoted by dot symbols and cross symbols. As a result of the power receiving coil 21 facing the loop conductors 11A and 11B, the loop conductors 11A and 11B are coupled to the power receiving coil 21 through a magnetic field.

At least a portion of the loop conductor 11A includes a concave portion DP indented toward the inside compared with the periphery of an area where the loop conductor 11A is formed and is longer than the length of the periphery of the power transmitting area. As a result, among the plurality of conductor portions forming the loop conductor 11A, the space between a conductor portion and another conductor portion facing and neighboring each other is reduced, such that the height of the loop conductor above the supporting structure (e.g., desk) on which the power transmitting apparatus is placed can be reduced. In the example illustrated in FIGS. 5A and 5B, the distance r from the center of the space between the conductor portion 11A2 and the conductor portion 11A3 facing and neighboring each other to these conductor portions is reduced, such that the height r of the loop conductor 11A above the supporting structure 300 can be reduced. This is also the case with the loop conductor 11B.

As is illustrated in FIG. 5B, the distance r between the metal layer 14 and the loop conductor 11A is substantially the same as the maximum distance r from the center point (center of a substantially rectangular portion) between the conductor portions facing each other among the conductor portions forming the loop conductor 11A to the loop conductor 11A. The relationship between the metal layer 14 and the loop conductor 11B is the same as the relationship described above. As a result, an eddy current induced in the metal layer 14 by a magnetic field generated by the loop conductor 11A is sufficiently suppressed. In other words, an eddy current can be suppressed by reducing the necessary height of the loop conductors 11A and 11B above the supporting structure 300.

Third Embodiment

Figure 7:
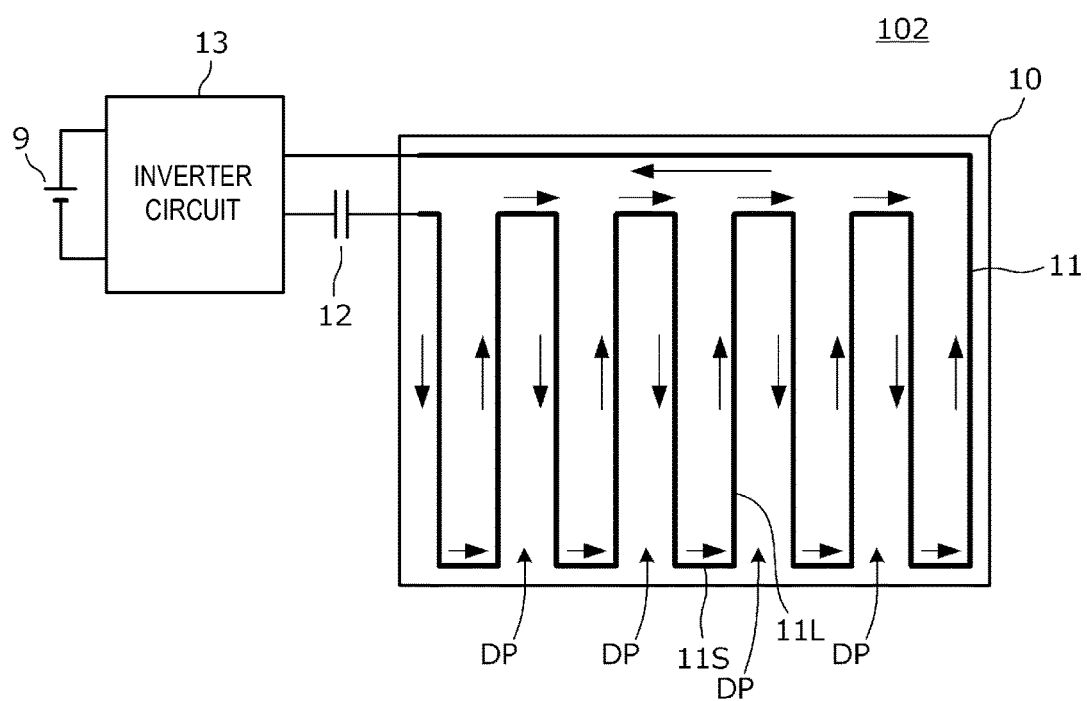
FIG. 7 is a circuit diagram of a wireless power transmitting apparatus according to a third embodiment.

FIG. 7 is a circuit diagram of a wireless power transmitting apparatus 102 according to a third embodiment. The wireless power transmitting apparatus 102 includes a substrate 10 formed of an insulator on which a loop conductor 11 is formed. As illustrated in FIG. 7, the loop conductor 11 includes a substantially meandering portion. The rest of the configuration is the same as that illustrated in FIG. 1.

Figure 8A:
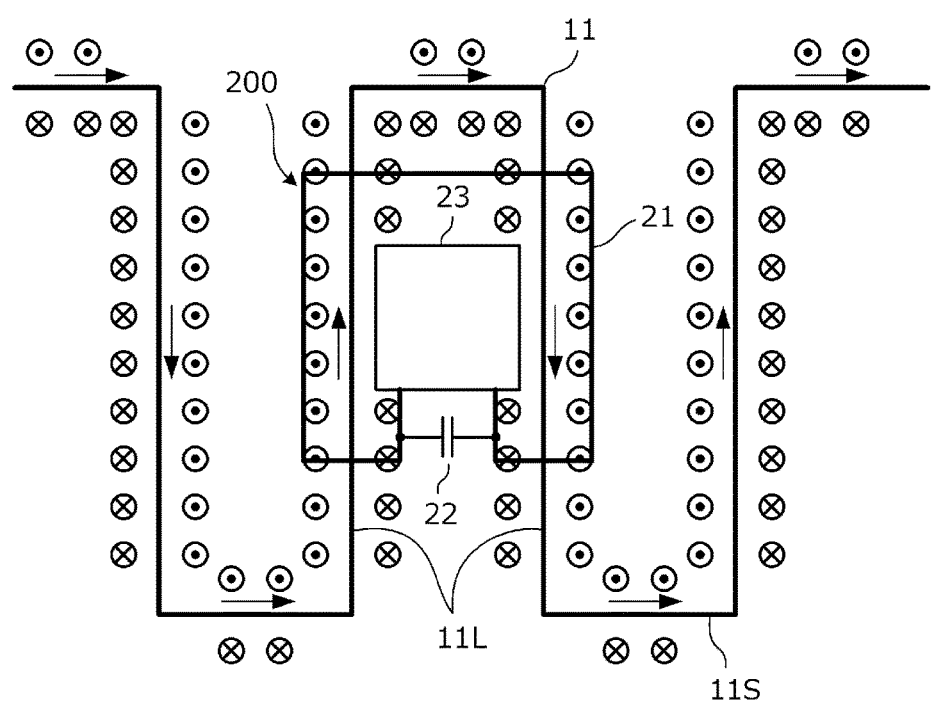
FIG. 8A is a plan view of coupling between part of the substantially meandering portion and the power receiving coil of a loop conductor.
Figure 8B:
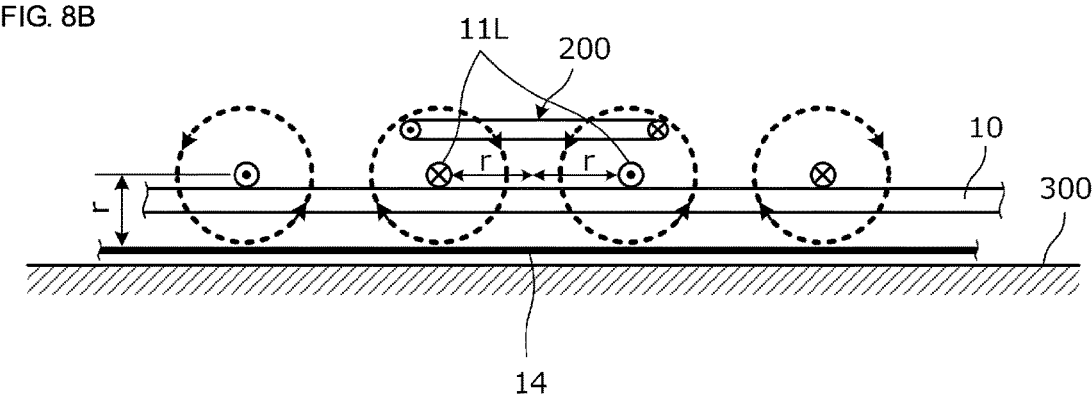
FIG. 8B is a front view thereof.

FIG. 8A is a plan view of a coupling between a part of the substantially meandering portion of the loop conductor 11 described above and the power receiving coil 21. FIG. 8B is a front view thereof.

The substantially meandering portion of the loop conductor 11 for power transmission is formed of a combination of long-path portions 11L and short-path portions 11S.

The power receiving apparatus 200 includes a power receiving coil 21, a capacitor 22, and a power receiving circuit 23. The power receiving coil 21 and the capacitor 22 form an LC resonant circuit whose resonant frequency is the same as the driving frequency of the inverter circuit 13 and the resonant frequency of the LC resonant circuit on the power transmitting side. In FIG. 8A, cross symbols and dot symbols represent the directions of a magnetic field generated by a current flowing through the loop conductor 11. In this example, portions of two of the long-path portions 11L are located within the loop formed by the power receiving coil 21 of the power receiving apparatus 200 in plan view. Hence, the power receiving coil 21 links with and is strongly coupled to magnetic flux generated by the two of the long-path portions 11L.

As illustrated in FIG. 8B, the distance r between the metal layer 14 and the long-path portions 11L of the loop conductor is substantially the same as the maximum distance r among distances from the center of the conductors facing each other to the long-path portions 11L. As a result, an eddy current induced in the metal layer 14 by magnetic fields generated by the long-path portions 11L of the loop conductor is sufficiently suppressed.

The loop conductor 11 includes concave portions DP at least portions of which are indented toward the inside compared with the periphery of the loop formation area of the loop conductor 11 and the total length of the loop conductor 11 is larger than the length of the periphery of the power transmitting area. As a result, among a plurality of the long-path portions 11L forming the loop conductor 11, the space between a long-path portion 11L and another long-path portion 11L neighboring and facing each other is reduced. Hence, the distance between the center of the space and these long-path portions 11L is reduced, such that the height of the loop conductor above the supporting structure (e.g., desk) on which the power transmitting apparatus is placed can be reduced. In the example illustrated in FIGS. 8A and 8B, the distance r from the center of the space between the two long-path portions 11L neighboring and facing each other to these conductor portions is reduced, such that the necessary height r of the loop conductor 11 above the supporting structure 300 can be reduced.

The descriptions of the above embodiments are only examples in all respects and are not limiting. Partial replacement or combinations of the configurations illustrated in the embodiments are possible.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A wireless power transmitting apparatus comprising:
a first loop conductor and a second loop conductor each for power transmission and each having an inductance, wherein the first loop conductor and the second loop conductor are electrically connected either in parallel or in series, and wherein both loop conductors include a plurality of rectangular portions;
an inverter circuit configured to receive a DC voltage, convert the DC voltage into an AC voltage, and apply the AC voltage to the first loop conductor and the second loop conductor;
a capacitor connected between one end of at least one of the loop conductors and at least one end of the inverter circuit; and
a metal layer covering one face of two faces formed by the first loop conductor and the second loop conductor, the one face being opposite to a face opposed to a power receiving apparatus;
wherein the first loop conductor includes a concave portion that is at least partly indented toward an inside of a periphery of a loop formation area of the loop conductor and has a total length larger than a peripheral length of the loop formation area;
wherein at least one rectangular portion of the second loop conductor is located at the concave portion of the first loop conductor; and
wherein a current flow direction of rectangular portions of the second loop conductor is the same as a current flow direction of the concave portion of the first loop conductor.

2. The wireless power transmitting apparatus according to claim 1,
wherein the metal layer is formed of aluminum, copper, brass, bronze, or zinc.

3. The wireless power transmitting apparatus according to claim 1,
wherein a distance between the metal layer and the loop conductors is substantially identical to a maximum distance between a center of an area surrounded by the loop conductors and the loop conductors.

4. A wireless power transmission system formed of the wireless power transmitting apparatus according to claim 1 and a power receiving apparatus configured to receive power as a result of being coupled to the wireless power transmitting apparatus through a magnetic field.

5. The wireless power transmission system according to claim 4,
wherein $d1 \geq d2$, $d1$ being a height of the loop conductors above the metal layer and $d2$ being a distance between the loop conductors and a power receiving coil of the power receiving apparatus.

* * * * *